J. Q. & A. T. ADAMS.
FEEDER.
APPLICATION FILED MAR. 2, 1914.

1,150,091.

Patented Aug. 17, 1915.
3 SHEETS—SHEET 1.

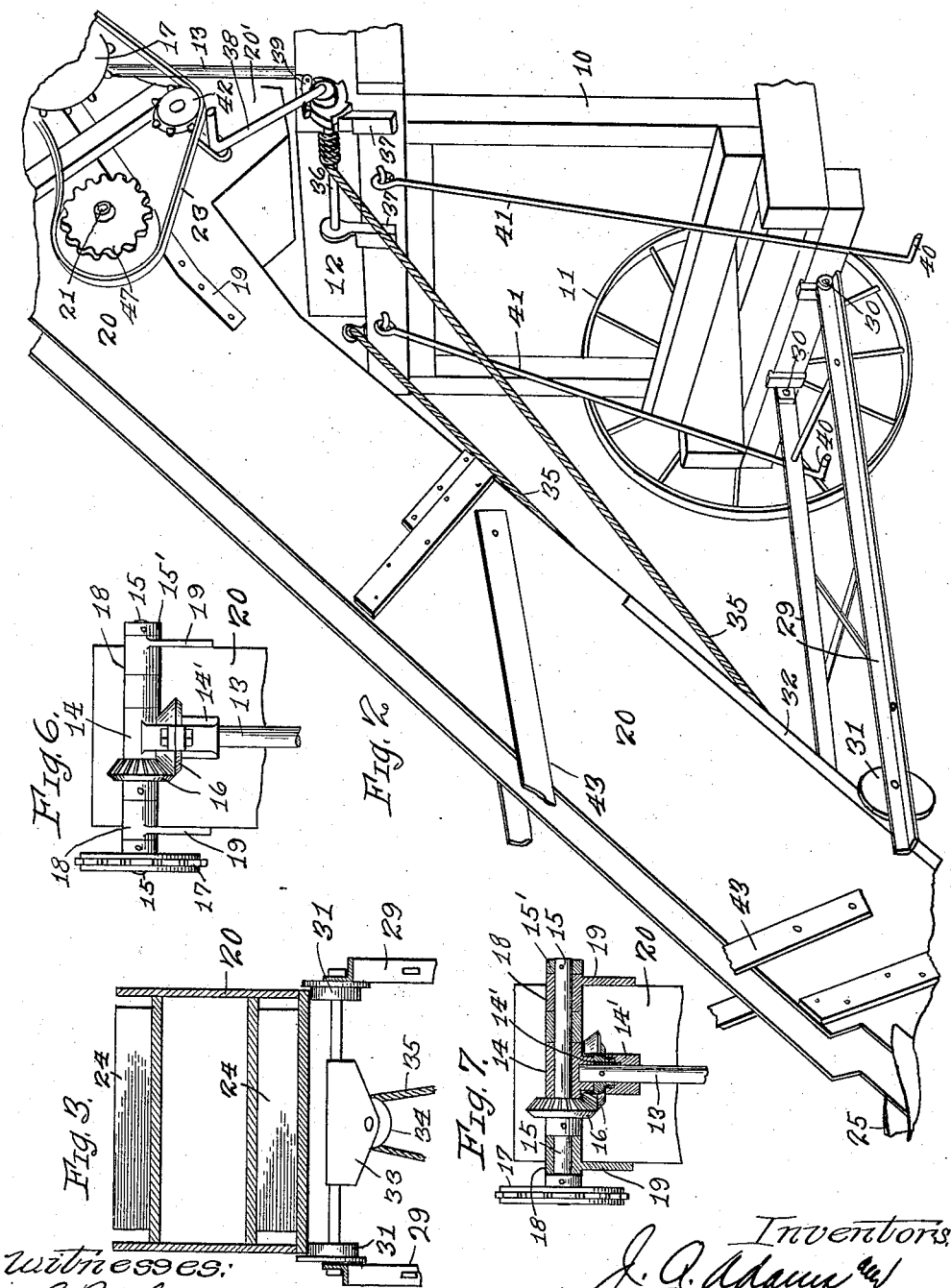

J. Q. & A. T. ADAMS.
FEEDER.
APPLICATION FILED MAR. 2, 1914.

1,150,091.

Patented Aug. 17, 1915.
3 SHEETS—SHEET 3.

Witnesses:

Inventors:

UNITED STATES PATENT OFFICE.

JOHN Q. ADAMS, OF MARSEILLES, AND ALONZO T. ADAMS, OF MOLINE, ILLINOIS, ASSIGNORS TO MARSEILLES COMPANY, OF EAST MOLINE, ILLINOIS, A CORPORATION OF ILLINOIS.

FEEDER.

1,150,091.   Specification of Letters Patent.   Patented Aug. 17, 1915.

Continuation of application Serial No. 486,817, filed March 29, 1909. This application filed March 2, 1914. Serial No. 822,086.

*To all whom it may concern:*

Be it known that we, JOHN Q. ADAMS and ALONZO T. ADAMS, citizens of the United States, residing, respectively, at Marseilles, La Salle county, Illinois, and Moline, Rock Island county, Illinois, have invented certain new and useful Improvements in Feeders, of which the following is a specification, reference being had therein to the accompanying drawing.

Our invention relates to improvements in feeders, and especially to that class used to convey ears of corn to corn shellers.

The construction and operation of practical devices embodying the various features of our invention will now be described in detail and the particular improvements will then be clearly defined in the appended claims.

Figure 1:
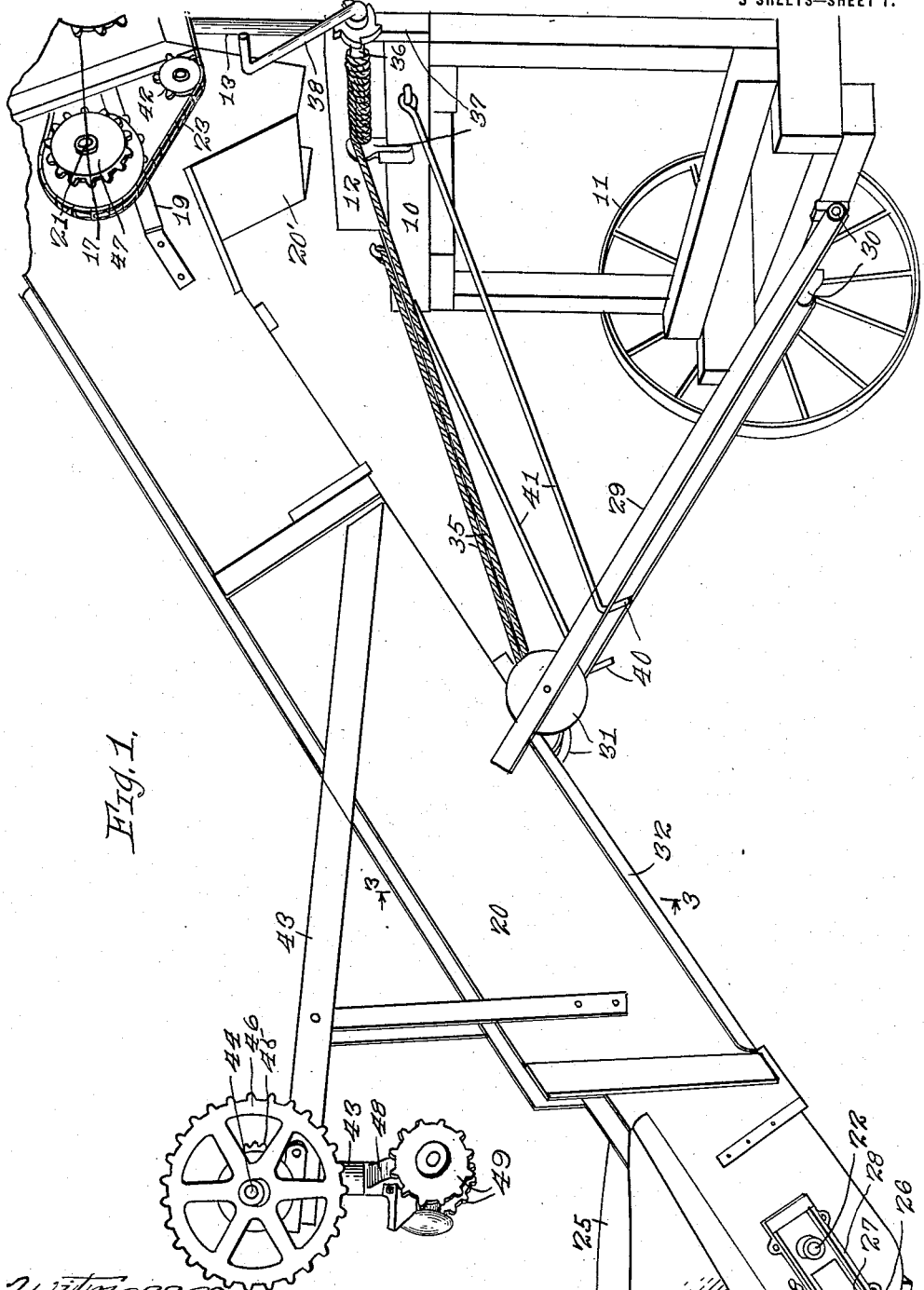
Figure 4:
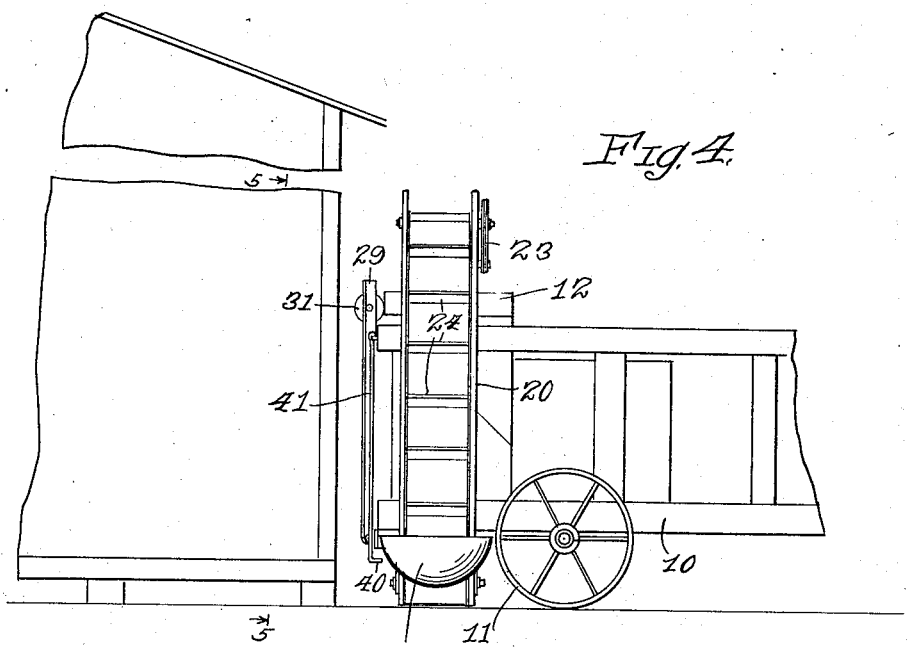
Figure 5:
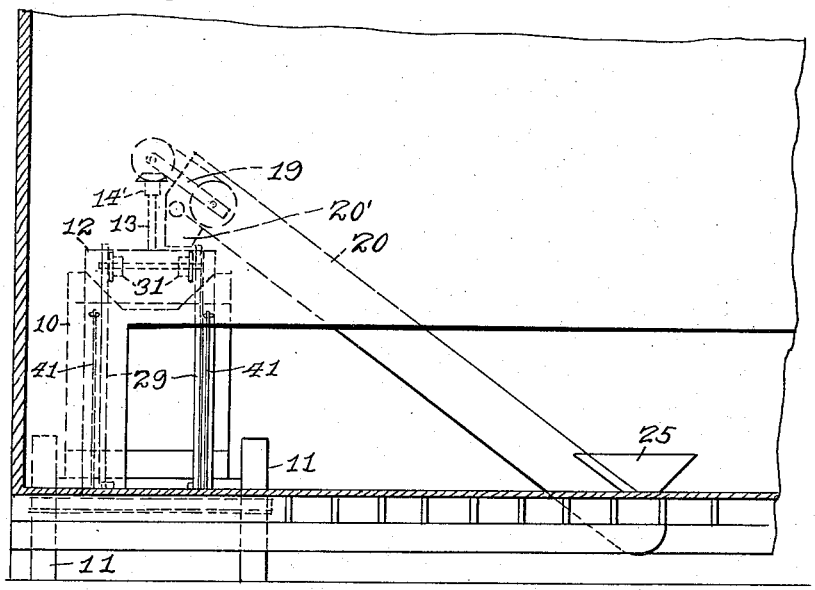

In the accompanying drawings illustrating a practical embodiment of our invention, Figure 1 is a perspective view of the front portion of a corn sheller embodying our present invention and showing the feeder raised, with parts broken away; Fig. 2 is a similar view showing the feeder lowered; Fig. 3 is a sectional view on the line 3—3 of Fig. 1; Fig. 4 is a view of the sheller set against the wall of a crib with the feeder swung to one side of the sheller and disposed parallel with the crib, and with the lifting and bracing arms folded in position on the end of the sheller; Fig. 5 is a view of the same parts taken inside the crib on the line 5—5; Fig. 6 is a detail view of a form of means that may be practically employed to rotatably support the upper end of the feeder on the sheller, and Fig. 7 is a sectional view of parts of Fig. 6.

In the drawings the reference numeral 10 represents the main frame of a corn sheller, only the front or receiving portion being shown as the construction of the sheller may be of any suitable form and its features need only a general reference. These machines are usually portable being mounted upon wheels 11 for transportation and are provided at the top with a receiving hopper 12 leading to suitable sheller mechanism. An upright shaft 13 is suitably supported in bearings on the frame in rear of and extends above the hopper, where it is provided at its upper end with a horizontal cross-head 14 which is provided on its underside with a step bearing to receive the upper end of the shaft as shown in Fig. 7 so that the cross-head may turn on the shaft as its support. The shaft 13 is suitably driven, and the head 14 forms an extended bearing for a short transverse shaft 15 which is driven from the shaft 13 by a suitable pair of bevel gears 16 and which carries a sprocket wheel 17 fixed on one end and a collar 15' fixed on its other end. The shaft 15 is provided with loose sleeves 18 to pivotally carry the supporting-bars 19 fixed to the upper end of the trunk or casing 20 of the feeder hereinafter more fully described so that the feeder may swing up and down vertically. It is to be understood that the parts carried by the shaft 13 are prevented from becoming displaced by any suitable means, as for example by pinning the lower gear 16 thereon and providing the cross-head with a depending portion 14' loosely surrounding the shaft below the gear and that while the organization disclosed is suitable it may be varied within any limits that will furnish connections for driving the conveyer in the feeder and a bearing or support for the upper end of the feeder so that the latter can be swung laterally and moved or inclined vertically on its upper or rear support.

The feeder comprises a suitable trunk or casing and an endless conveyer traveling therein. The rear end of the trunk 20 is supported in position above and in rear of the front or receiving end of the sheller and is provided with a downwardly directed outlet or discharge 20' leading into the hopper 12, and is provided with upper and lower cross-shafts 21 and 22, respectively, the former being driven by a sprocket chain 23 from the sprocket wheel 17. The shafts 21 and 22 are provided with the usual sprockets (not shown) in the trunk to drive an endless conveyer having the conveying flights 24 of suitable construction and arrangement for elevating the corn or other material from the lower end of the trunk to its discharge into the hopper, and preferably the lower or receiving end of the trunk is provided with a flared mouth or hopper 25 to receive the material which may be dumped or shoveled directly therein or fed thereto by a suitable drag-conveyer (not shown). Either of the shafts 21, 22 may be adjustably mounted to take up slack in the endless conveyer; in the form shown the lower shaft 22 is so mounted by means of the adjusting bolts 26 threaded into lugs or brackets 27 on the trunk and revolubly connected with the shaft-bearings which slide in suitable guides 28.

The feeder is raised and lowered by means of an underneath lifting-arm 29 pivoted to the lower portion of the main frame 10 as at 30 below and in front of the pivotal connection of the feeder and provided at its outer free end with an anti-friction bearing running on the underside of the feeder casing. This lifting-arm may be of any suitable construction, and in the present embodiment it is shown as a frame composed of an opposite pair of suitably connected and braced side pieces provided with flanged wheels 31 running on wear plates or tracks 32 on the underside of the casing. The arm or frame is preferably provided with a shell 33 pivoted to its outer end and having a sheave 34 around which a rope or cable 35 passes, one end of which is fastened to the frame 10 above the pivot 30 and the other is wound upon a suitable windlass or winding drum 36 journaled in bearings 37 on the top of the frame above the pivot 30 and provided with a crank handle 38 and a holding dog 39. The lifting-frame is so pivoted to the lower portion of the front end of the frame 10 that when the trunk or casing is swung around toward either side of the machine sufficiently to clear the lifting-frame the latter may be turned or folded up against the front end of the main frame out of the way so that the sheller can be backed up or set against the wall or side of a crib or bin to allow the trunk to extend alongside the crib to receive the grain.

The lifting arm or frame is provided with suitable eyes adapted to receive the hooked ends 40 of an opposite pair of supporting rods 41 pivotally attached to the upper part of the frame above the pivot 30 as clearly shown in the drawings. The rods are so pivoted to the upper part of the front end of the sheller frame that when the latter is set against the crib or bin as above described the rods may be turned or folded down against the front end of the frame out of the way to allow the sheller to stand close to the crib or building.

A movable idler 42 is provided on the upper end of the trunk under which the understretch of the chain passes and whereby the slack may be taken up.

The feeder may be provided with a frame 43 at or near its outer end which carries a suitable shaft 44 having an opposite pair of sprockets 45 and 46, the latter of which may be driven from a second sprocket 47 upon the end of the upper shaft 21. The frame 43 is also provided with a swiveled head 48 by which the discharge end of a suitable drag-conveyer (not shown) may be supported and whose conveyer flights may be suitably driven from the sprocket wheel 49, the arrangement of these parts being such that the drag-conveyer may be led in extension of or at an angle to the lower end of the feeder, as shown for example in Patent No. 659,838, dated Oct. 16, 1900 to John Q. Adams, one of these applicants.

When the parts are in the relation shown in Fig. 1 the rope or cable is wound upon its drum to draw the underneath trolley-arm upwardly and raise the feeder; the various parts are then in position for transporting the machine, and the rods 41 take all the weight of the feeder off its ropes or cables and winding-drum and prevent the feeder from swinging or vibrating when moved from place to place. It is obvious that the rods form a rigid support to hold the trunk against vertical vibration that would result from its mere suspension by the flexible and yielding cable or rope, and that the opposed relation of the rods, secured by attaching them to the frame beyond the trunk and arm, in connection with the raising-arm and trunk form a rigid structure whereby vibration of the trunk from side to side is prevented. The rods hold the arm against vibration, and the bottom of the trunk lies snugly between the flanges of the rollers or trolley wheels and the sides of the frame are extended up to snugly embrace the sides of the trunk so that the parts rest in compact relation and obviate vibration of the trunk. This result would preferably characterize all modifications of the trunk or casing and its lifting devices.

When it is desired to use the feeder the hooks are disconnected and the rope is unwound from the drum to allow the outer end of the feeder to drop to receiving position as shown in Fig. 2, the trolley-arm traveling downwardly upon its track until the feeder reaches its lower position when the trolley-arm may be held by the dog or may be allowed to fall to position upon or near the ground as shown in Fig. 2. The normal receiving position of the outer end of the feeder is at the level of the bottom or base of the frame, when it rests on the floor or ground upon which the frame is located, the term ground being used herein with this meaning. By this arrangement the feeder may be quickly and easily raised or lowered, and the operation of raising it requires but slight force as the cable, sheave and drum multiply the power, while the rolling contact of the bearings or wheels 31 reduces friction to a minimum.

The upper support enables the feeder to be raised or lowered vertically and swung around laterally to either side of the machine. When the feeder is to be disposed at either side of the longitudinal center of the machine the trunk is lowered and the supporting frame 29 being below and shorter than the trunk falls away and disengages from it; the latter may now be manually turned or swung to suitable position, as far as at a right angle to either side of the machine if desired. The outlet 20' in all positions of the trunk registers with the hopper 12, and the vertical axis or pivot afforded by the upright shaft 13 is sufficiently in the rear of the front face or end of the sheller with respect to the width of the trunk to allow the latter to lie approximately flush or in alinement with the sheller end when swung to its extreme position at either side of the machine, as shown in Figs. 4 and 5. The supporting frame 29 and bracing rods 41 fold to approximately vertical position against the end of the frame 10 so that they are out of the way and the machine may be backed up or set against the wall or side of a crib or bin as there shown with the feeder extending parallel with or alongside the crib to receive the grain, and the feeder is of sufficient length for cribs of ordinary capacity that the entire contents of the crib may be handled without resetting the machine, while the feeder and its drag-conveyer provide for handling the contents of longer cribs without resetting the machine. The organization comprising a laterally swinging, vertically movable feeder and a folding underneath support for it, provides this capability of setting the sheller up against the crib or building so that the entire contents may be handled without relocating the machine; the working relation between the laterally swinging and vertically movable feeder and its folding support enables the latter to raise and lower the former and to be folded up out of the way when it is swung at a right angle to the associated machine to allow the latter to be placed close to the crib or building. After the work is completed the drag-conveyer (if one has been used) is detached from the head 48 on the trunk and the machine is moved away from the building or crib sufficiently to allow the supporting frame 29 to fall to its extended position and the feeder to be swung manually to the longitudinal center of the machine over the frame, when the windlass may be operated to lift the frame and feeder until the rods 41 may be hooked into the frame, at which time the device is again ready for transportation. Also, when the machine is located in the driveway of a crib or building the feeder may be swung to either side to receive the material from either flank at the points where the loading is done. Machines that do not have this capability of swinging the feeder laterally must be set at a distance from the crib equal to the length of the feeder, and as the latter does not extend alongside the crib the machine must be reset or relocated at the different points along the length of the crib where the loading is done to enable the entire contents thereof to be conveniently loaded into the end of the feeder, instead of receiving the material at practically all points along its length without changing the location of the machine. Also, if located in the driveway of a crib or building the operator would have to carry or throw the material the distance the machine so unprovided with the laterally swinging feeder is away from the point of work, instead of shoveling or discharging it directly into the feeder set close to that point. By providing an underneath support we are able to entirely disengage it from the trunk so that the latter is capable of lateral movement relatively to the support and may be swung on its pivot to either side of the longitudinal center of the machine to receive the material from either side of the machine as well as from its end. Also, by this arrangement the underneath support is not interfered with by the vertical shaft 13, the hopper 12 and the gearing for driving the trunk-conveyer as would be the case with an overhead support; and the underneath support enables the machine to be taken through low doorways and into the driveways of double cribs where it would be impossible to take a machine that had an overhead support.

It is obvious that the shape and form of the trolley-arm may be varied, and that the bearing or bearings at its free end may be of suitable form to coöperate with the feeder; for example, while the trunk shown in the present embodiment is substantially square in cross-section and a pair of rollers having inwardly directed bearing surfaces lying inside their flanges is employed, the form of these parts may be varied. Other changes in details may be made without departing from the scope of our invention.

This application is filed in lieu and as a continuation of our application filed March 29, 1909, bearing Serial Number 486,317. In the present application we make no claims to the means for retaining the bevel gears 16 in mesh as the same forms the subject-matter of our application bearing Serial Number 693,964, filed April 29, 1912, as a division of our other above identified earlier application.

We claim:—

1. In a device such as described, an upright frame, a feeder-casing permanently pivoted at its upper end at the top of the frame and inclined with its lower end in its operative position on the ground, a swinging trolley-arm mounted on the frame below the casing and movably bearing at its free end upon the casing to vertically swing it upon its pivot to raise its lower end from the ground, and means to swing the trolley-arm upon the frame and cause its free end to travel upon the casing to swing it vertically.

2. In a device such as described, an upright frame, a feeder-casing permanently pivoted at its upper end at the top of the frame and inclined with its lower end in its operative position on the ground, a trolley-arm pivotally mounted near the bottom of the frame and having a roller at its free end bearing upon the casing to vertically swing it upon its pivot to raise its lower end, means to move the trolley-arm upon its pivot and cause the free end of the arm to travel upon the casing to swing it vertically, and a pair of rods pivoted on the frame beyond the sides of the feeder and adapted to engage the arm when raised.

3. In a device such as described, an upright frame, a feeder-casing permanently pivoted at one end at the top of the frame and inclined to rest at its lower end upon the ground, a trolley-arm pivotally mounted near the bottom of the frame and bearing at its free end upon the underside of the casing to vertically swing the latter upon its pivot to raise its lower end from the ground, a sheave on the trolley-arm, a cable running through the sheave and fixed at one end to the frame above the pivot of the arm, a winding-drum for the other end of the cable mounted on the frame above the pivot of the arm, and a pair of rods pivoted on the upper portion of frame to engage the arm when the latter is raised.

4. In a device such as described, an upright frame having a hopper at its top, an upright shaft on the frame, a feeder-casing pivotally mounted on the shaft to swing vertically and laterally of the frame about the hopper and having an outlet at its pivoted end registering with the hopper and with its free end inclined to near the bottom of the frame to reach the ground, a trolley-arm pivotally mounted on the frame below the casing and bearing at its free end upon the casing to vertically swing it on its pivot to raise its lower end from the ground, a sheave on the trolley-arm, a cable running through the sheave and fixed at one end to the frame above the pivot of the arm, a winding-drum mounted on the frame above the pivot of the arm to receive the free end of the cable to raise and lower the arm and cause its free end to travel upon the casing, and a pair of rods pivoted on the frame between the casing and arm and adapted to oppositely engage the arm when the casing and arm are raised.

5. In a device of the class described, an upright frame, a vertical shaft near one end of the frame, a head rotatably mounted on the shaft and providing a horizontal bearing-box, a cross-shaft in the bearing-box, a feeder casing pivoted at its upper end on the cross-shaft and inclined with its lower end on the ground in its operative position, a trolley-arm pivotally mounted near the bottom of the frame and movably bearing at its free end upon the casing, and means to move the trolley-arm upon its pivot to cause its free end to travel upon the casing to swing it upon its pivot to raise its lower end.

6. In a device such as described, an upright frame having a hopper, a feeder-casing having an outlet at its upper end and pivotally mounted at its upper end on the frame to swing laterally of the frame and to swing vertically toward and from the ground, a trolley-arm pivotally mounted near the bottom of the frame and movably bearing on the casing, and means to raise the arm to cause its free end to travel upon the casing to swing the latter upon its pivot to raise its lower end from the ground, the hopper, outlet and pivot of the casing being so related that the outlet registers with the hopper in all positions of the casing on its pivot.

7. In a device such as described, an upright frame having a hopper, an upright shaft, a feeder-casing having an outlet and pivotally mounted at its upper end on the shaft to swing laterally of the frame and to swing vertically toward and from the ground, the frame and casing being so arranged that the latter lies in alinement with the former when it is swung to either side of it and with the outlet in register with the hopper, a trolley-arm pivoted to the lower portion of the frame and movably bearing on the casing, and means to raise the arm to cause its free end to travel upon the casing to swing it upon its pivot to raise its lower end from the ground.

8. In a device such as described, an upright frame, a feeder-casing mounted on the frame to swing vertically and laterally thereof and inclined to reach to the ground, and a lifting-arm pivoted on the frame to swing the casing vertically on its pivot when the casing is alined therewith and to swing up against the frame when the casing is swung laterally to clear the arm.

9. In a device such as described, an upright frame, a feeder-casing mounted on the frame to swing vertically and laterally and inclined to reach to the ground, and an arm pivotally mounted on the frame below the casing and shorter than the casing to disengage the latter when the arm and casing are swung down and to swing the casing vertically when the arm is swung up on its pivot.

10. In a device such as described, an upright frame, a feeder-casing mounted on the frame to swing vertically and laterally and inclined to reach to the ground at the front and at either side of the frame, and an arm pivoted on the frame below the casing to engage the casing to swing it vertically on its pivot when the arm is swung up on its pivot with the casing alined therewith and to disengage the casing when swung down on its pivot to allow the casing to swing laterally thereof.

11. In a device such as described, an upright frame, a feeder-casing mounted on the frame to swing vertically and laterally and inclined to reach to the ground, and an arm pivoted on the frame below the casing to engage and swing the casing vertically on its pivot when the arm is swung up on its pivot with the casing alined therewith and to disengage the casing when swung down on its pivot and to fold up against the frame when the casing is swung laterally of the arm.

12. In a device such as described, an upright frame, a vertically and laterally swinging feeder-casing pivotally mounted on the frame and inclined to reach to the ground, an arm pivoted on the frame underneath the casing to swing the latter vertically on its pivot when raised and to disengage the latter when lowered on its pivot, and a pair of rods pivoted on the frame above the arm to engage the latter when it is raised to engage the casing, the arm and rods folding on their pivots against the frame when the casing is swung laterally thereof.

13. In a device such as described, an upright frame, a vertically and laterally swinging feeder-casing pivotally mounted on the frame and inclined to reach to the ground, an arm pivoted at or near the bottom of the frame to vertically swing the casing on its pivot to raise its lower end, and a pair of rods pivoted on the frame between the arm and casing to engage the arm, the rods swinging down and the arm swinging up against the frame when disengaged and when the casing is swung to either side of the frame.

14. In a device such as described, an upright frame having a hopper, an upright shaft projecting above the frame, a feeder-casing pivotally mounted on the shaft to swing vertically and laterally and having an outlet in line with the hopper and inclined to near the bottom of the frame to reach to the ground, an arm pivoted on the frame below the casing to swing the casing vertically on its pivot, and a pair of rods pivoted on the frame between the arm and casing to oppositely engage the arm when the latter is raised, the rods swinging down and the arm swinging up when disengaged and when the casing is swung to either side of the frame.

15. In a device such as described, an upright frame having a hopper, an upright shaft on the frame, a head rotatably mounted on the shaft, a feeder-casing pivoted on the head and having an outlet registering with the hopper and inclined to near the bottom of the frame to reach to the ground, and an arm pivoted on the frame below the casing to swing up on its pivot to bear at its free end upon the casing to vertically swing the same on its head, the arm being shorter than the casing to disengage therewith when swung down on its pivot and turning on its pivot to position against the frame when the casing-head is turned on its shaft to swing the casing clear of the arm.

In testimony whereof we affix our signatures each in the presence of two witnesses.

JOHN Q. ADAMS.
ALONZO T. ADAMS.

Witnesses for J. Q. Adams:
 HENRY A. ADAMS,
 CURTIS N. KING.
Witnesses for A. T. Adams:
 W. G. DUFFIELD,
 JESSIE L. SIMSER.

Copies of this patent may be obtained for five cents each, by addressing the "Commissioner of Patents, Washington, D. C."